United States Patent
Sakata

(10) Patent No.: US 10,095,902 B2
(45) Date of Patent: Oct. 9, 2018

(54) BARCODE READER, BARCODE READING METHOD, AND RECORDING MEDIUM STORING PROGRAM

(71) Applicant: OLYMPUS CORPORATION, Hachioji-shi, Tokyo (JP)

(72) Inventor: Seiichiro Sakata, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/656,620

(22) Filed: Jul. 21, 2017

(65) Prior Publication Data

US 2018/0032767 A1 Feb. 1, 2018

(30) Foreign Application Priority Data

Jul. 29, 2016 (JP) .................. 2016-149531

(51) Int. Cl.
*G06K 17/00* (2006.01)
*G06K 7/10* (2006.01)
*G06K 7/14* (2006.01)

(52) U.S. Cl.
CPC ....... *G06K 7/1093* (2013.01); *G06K 7/10396* (2013.01); *G06K 7/10722* (2013.01); *G06K 7/1413* (2013.01)

(58) Field of Classification Search
CPC .................. G06K 7/10851; G06K 7/10861

USPC ............... 235/462.15, 462.07, 462.09, 462.1
See application file for complete search history.

(56) References Cited

U.S. PATENT DOCUMENTS

| | | | | |
|---|---|---|---|---|
| 6,902,114 B2 * | 6/2005 | Hashimoto | ........ | G06K 7/10851 235/462.15 |
| 9,465,966 B2 * | 10/2016 | Hong | .................. | G06K 7/10732 |
| 9,813,505 B2 * | 11/2017 | Pai | .......................... | H04L 67/141 |
| 2012/0067952 A1 * | 3/2012 | Matsuda | .................. | G06K 5/00 235/437 |
| 2014/0131443 A1 | 5/2014 | Smith | | |
| 2014/0166761 A1 | 6/2014 | Todeschini | | |

FOREIGN PATENT DOCUMENTS

| | | |
|---|---|---|
| JP | 4127001 | 7/2008 |
| JP | 2014-099176 | 5/2014 |

* cited by examiner

*Primary Examiner* — Daniel St Cyr
(74) *Attorney, Agent, or Firm* — John C. Pokotylo; Pokotylo Patent Services

(57) ABSTRACT

A barcode reader includes: a reading unit that reads a barcode; a decoder that decodes the barcode read by the reading unit so as to obtain barcode information; a determination unit that determines whether the barcode information obtained by the decoder matches barcode information stored in a storage; and a changing unit that changes a reading condition of the reading unit or a decoding condition of the decoder when a result of the determination performed by the determination unit is "match".

12 Claims, 15 Drawing Sheets

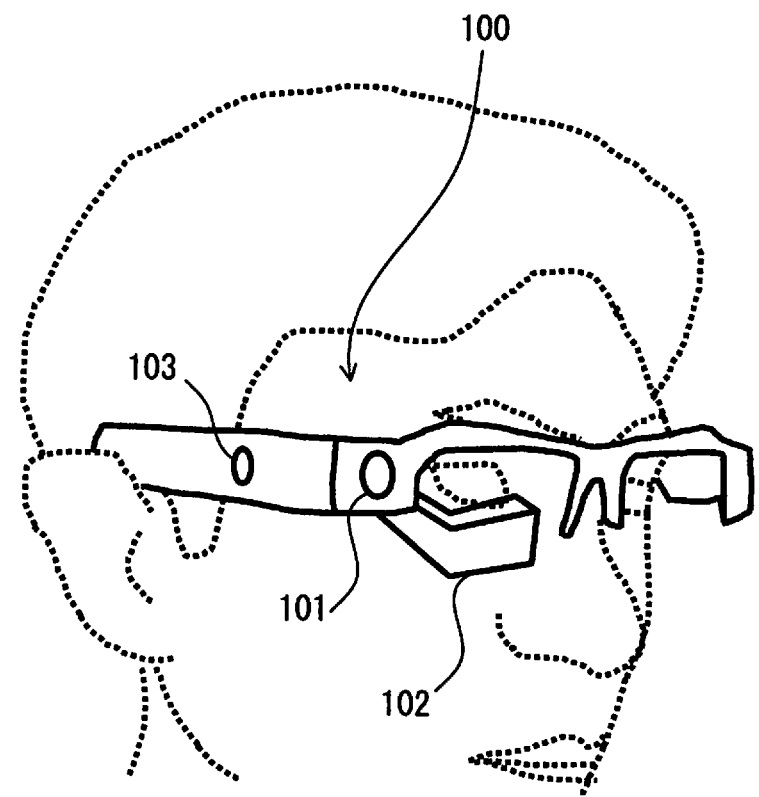
F I G. 1

N3, 1-1, PRODUCT A, 1 ↵

S4, 2-1, PRODUCT B, 2 ↵

FIG. 3

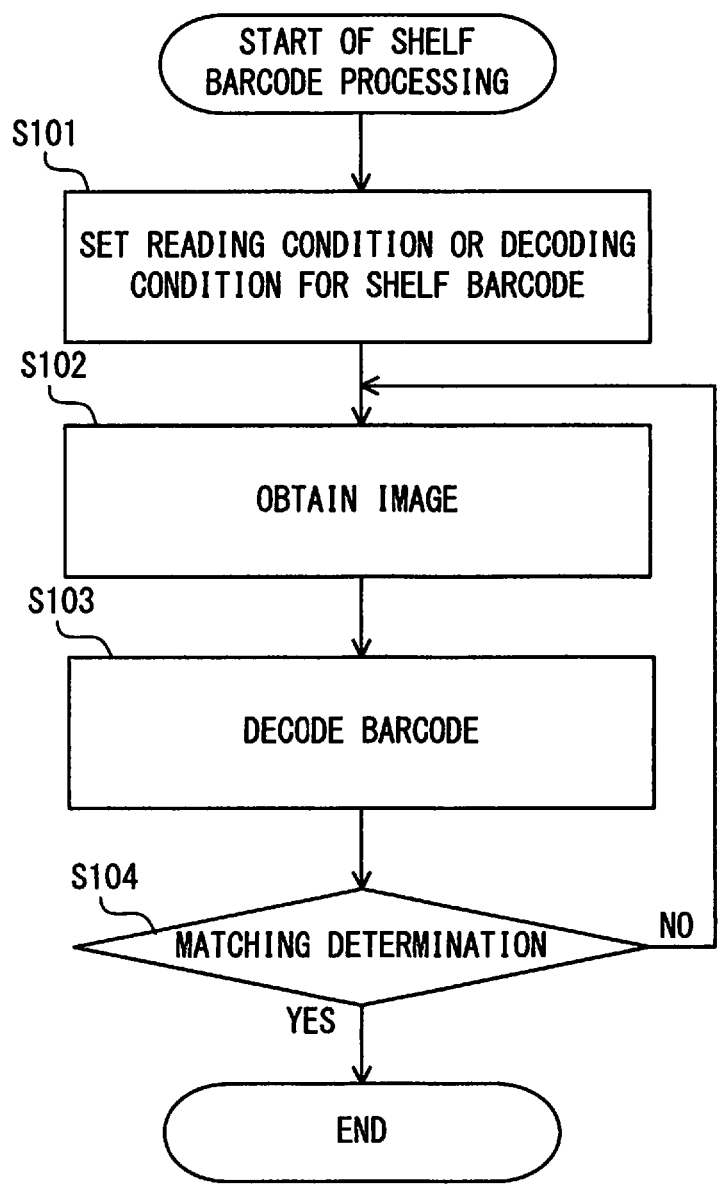
F I G. 7

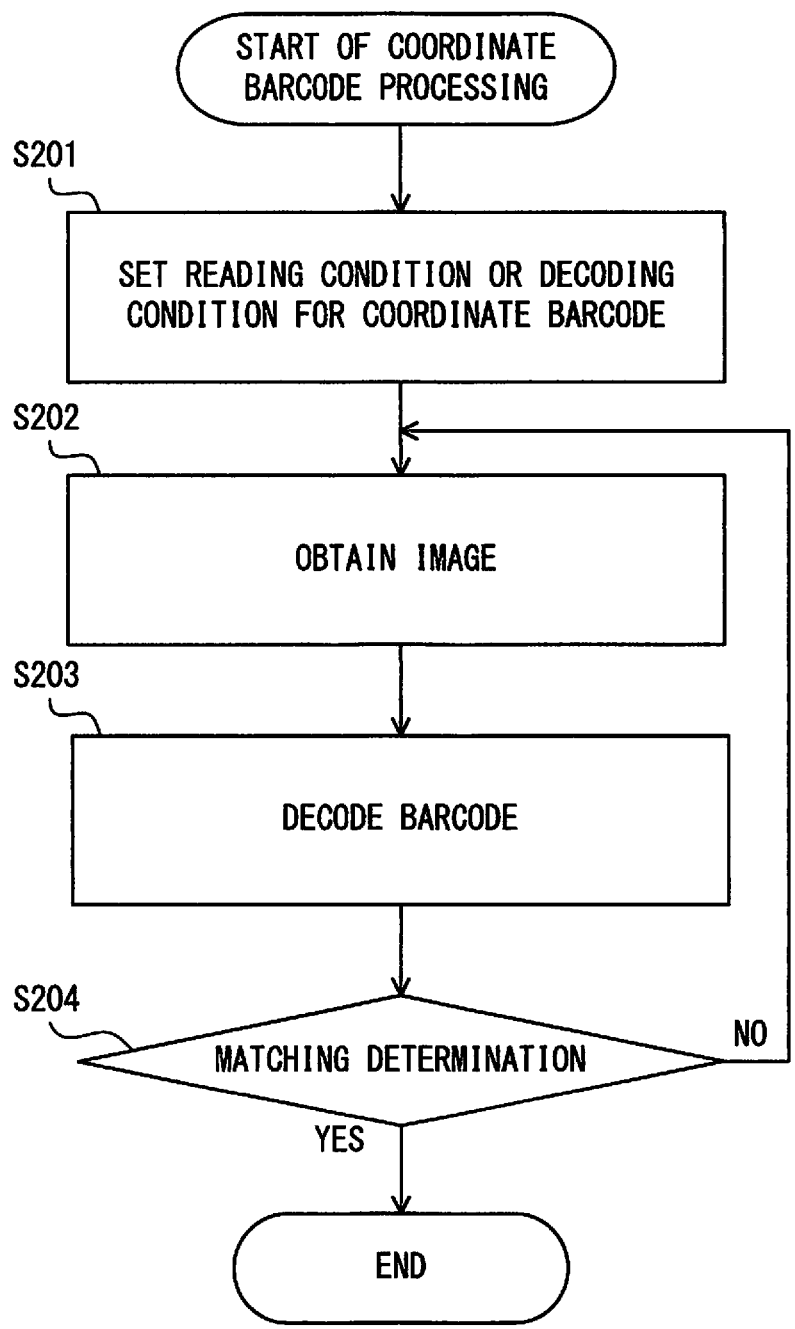
F I G. 9

| | | [PICKING LIST] | | |
|---|---|---|---|---|
| PRODUCT | SHELF NUMBER | COORDINATE | QUANTITY | BARCODE |
| PRODUCT A | N3 | 1-1 | 1 |  |
| PRODUCT B | S4 | 2-1 | 2 |  |

BARCODE READER, BARCODE READING METHOD, AND RECORDING MEDIUM STORING PROGRAM

CROSS-REFERENCE TO RELATED APPLICATIONS

This application is based upon and claims the benefit of priority of the prior Japanese Patent Application No. 2016-149531, filed Jul. 29, 2016, the entire contents of which are incorporated herein by reference.

FIELD

The present invention relates to a barcode reader that reads a barcode, a barcode reading method of the barcode reader, and a recording medium storing a program executed in the barcode reader.

BACKGROUND

Conventionally, as work performed in a distribution warehouse, picking work is known in which a worker picks up a product or the like according to a work instruction. In this picking work, a worker picks up a product or the like according to the following procedures while using, for example, a barcode reader (also referred to as a barcode scanner).

(1) First, the worker scans a form barcode printed on a picking list (a form) with a barcode reader (for example, a handheld barcode reader). The picking list is an example of a work instruction. As illustrated in FIG. 14, a product to be picked up, a position where the product is placed in a distribution warehouse (a shelf number and a coordinate), a quantity of the product (the number of products to be picked up), and a form barcode in which information including these items is coded are printed on the picking list. For example, what is printed on the first line in the picking list illustrated in FIG. 14 is that a product to be picked up is a "product A", the product is placed at a position of a coordinate "1-1" on a shelf with a shelf number "N3", and the number of products to be picked up is "1", and a form barcode in which information including these items is coded is also printed on the first line. In other words, this first line indicates that an instruction to pick up "one" "product A" placed at a position of a coordinate "1-1" of a shelf with a shelf number "N3" is to be given to a worker.

(2) In the procedure (1) described above, if, for example, a form barcode in the first line in the picking list illustrated in FIG. 14 is scanned, the shelf with the shelf number "N3", a destination, where the "product A" is placed is displayed on a display portion of the barcode reader, and the worker moves to the shelf with the shelf number "N3" according to the displayed destination.

In the distribution warehouse where the picking work is performed, a shelf barcode 302 is attached to each shelf 301, wherein a shelf number of the shelf 301 is coded in the shelf barcode 302, for example, as illustrated in FIG. 15. A coordinate barcode 304 is attached to each position 303 on each shelf 301, wherein a coordinate of the position 303 is coded in the coordinate barcode 304. A product barcode 306 is attached to each product 305 placed at each position 303 on each shelf 301, wherein information on the product 305 is coded in the product barcode 306.

(3) When the worker arrives at the shelf with the shelf number "N3", the worker scans a shelf barcode attached to the shelf with the shelf number "N3" with the barcode reader.

(4) When the shelf number ("N3") represented by the shelf barcode scanned in the procedure (3) matches the shelf number ("N3") included in the information represented by the form barcode scanned in the procedure (1) described above, the coordinate "1-1" for a position where the "product A" is placed on the shelf with the shelf number "N3" is displayed on the display portion of the barcoded reader, and the worker moves to a position of the coordinate "1-1" according to the displayed coordinate.

(5) When the worker moves to the position of the coordinate "1-1", the worker scans a coordinate barcode attached to the position of the coordinate "1-1" with the barcode reader.

(6) When the coordinate ("1-1") represented by the coordinate barcode scanned in the procedure (5) matches the coordinate ("1-1") included in the information represented by the form barcode scanned in the procedure (1) described above, the worker scans a product barcode attached to a product placed at the position of the coordinate "1-1" with the barcode reader. Then, when information on a product that is represented by the product barcode scanned at this point matches information on a product that is included in the information represented by the form barcode scanned in the procedure (1) described above, the worker picks up the product. Here, the picking work with respect to the form barcode scanned in the procedure (1) described above (the picking work with respect to the "product A") is terminated.

After that, the process returns to the procedure (1), and the same procedures are performed repeatedly with respect to each of the remaining form barcodes in the picking list.

When a worker performs the picking work described above, there is a need for the worker to repeatedly scan four types of barcodes that are a form barcode, a shelf barcode, a coordinate barcode, and a product barcode every time he/she picks up a product.

A symbol reader (see Japanese Laid-open Patent Publication No. 2014-99176) in which one or more symbols (such as barcodes) are collected and displayed on a display so as to be selected by a user, and a picking cart (see Japanese Patent No. 4127001) which makes it possible to realize, for example, a thoroughly paperless environment are known as devices used to perform a picking work.

SUMMARY

An aspect of the present invention provides a barcode reader including: a storage that stores input barcode information; a reading unit that reads a barcode; a decoder that decodes the barcode read by the reading unit so as to obtain barcode information; a determination unit that determines whether the barcode information obtained by the decoder matches the barcode information stored in the storage; and a changing unit that changes a reading condition of the reading unit or a decoding condition of the decoder when a result of the determination performed by the determination unit is "match".

Another aspect of the present invention provides a barcode reading method of a barcode reader, the method including: storing input barcode information in a storage; reading a barcode; decoding the read barcode so as to obtain barcode information; determining whether the obtained barcode information matches the barcode information stored in the storage; and changing a reading condition of the reading or a decoding condition of the decoding when a result of the determination is "match".

Yet another aspect of the present invention provides a non-transitory computer-readable recording medium storing a program for causing a computer of a barcode reader to execute a process including: storing input barcode information in a storage; reading a barcode; decoding the read barcode so as to obtain barcode information; determining whether the obtained barcode information matches the barcode information stored in the storage; and changing a reading condition of the reading or a decoding condition of the decoding when a result of the determination is "match".

BRIEF DESCRIPTION OF DRAWINGS

FIG. 1 is a perspective external view of a barcode reader according to an embodiment;

FIG. 3 illustrates an example of picking order data;

FIG. 7 is a flowchart that illustrates an example of shelf barcode processing (S10);

FIG. 9 is a flowchart that illustrates an example of coordinate barcode processing (S20);

DESCRIPTION OF EMBODIMENTS

Figure 2:
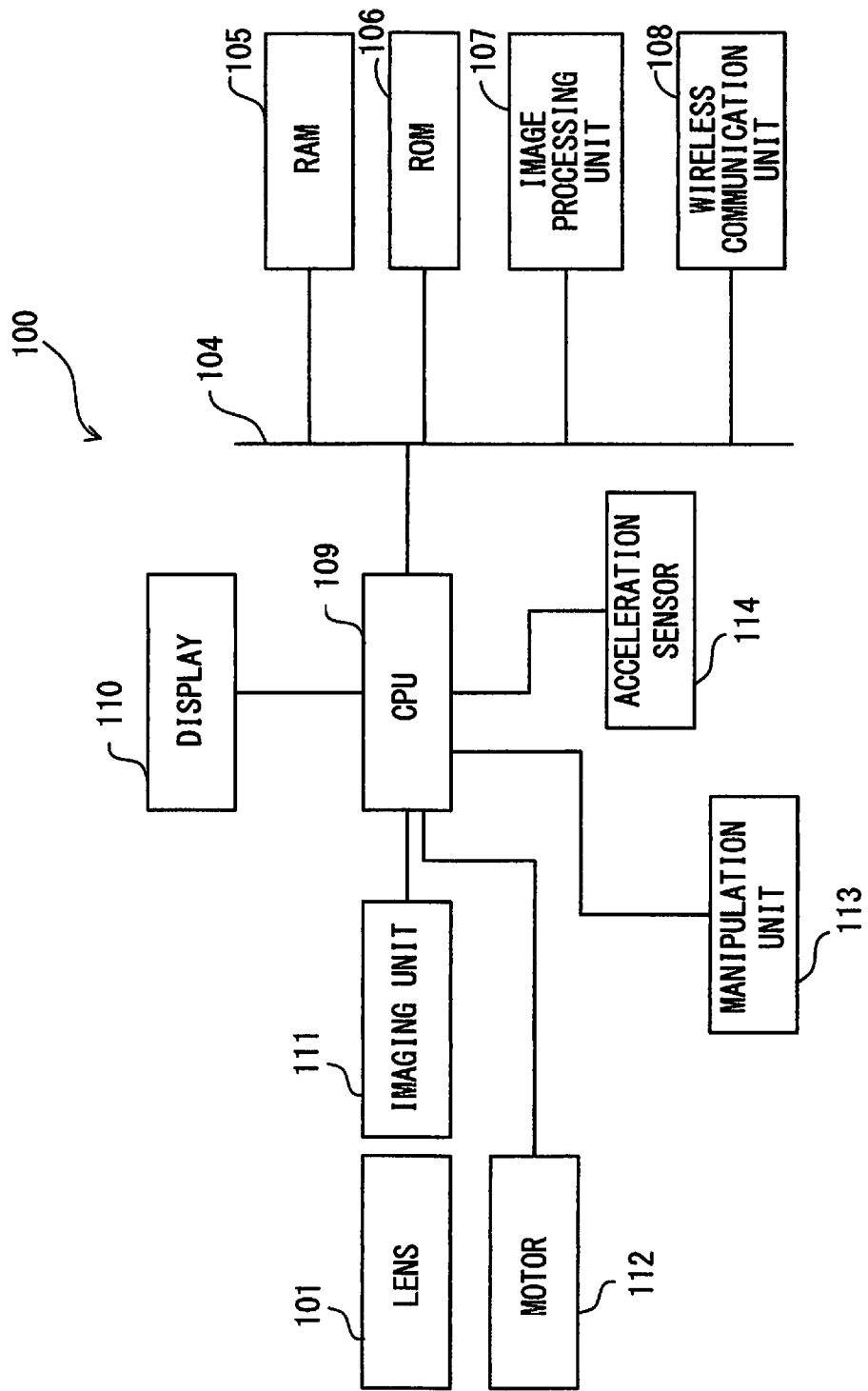
FIG. 2 illustrates an example of a hardware configuration of the barcode reader according to the embodiment.

Embodiments of the present invention will now be described with reference to the drawings.

FIG. 1 is a perspective external view of a barcode reader according to an embodiment of the present invention.

As illustrated in FIG. 1, a barcode reader 100 is mounted like glasses on the head of, for example, a worker who performs a picking work in a distribution warehouse or the like, and includes a lens 101 and a display optical system 102 at the front and a manipulation button 103 on the side.

The lens 101 is an optical system that collects, into an imaging unit 111 described later (not illustrated in FIG. 1), a light flux from a subject that includes a barcode such as a one-dimensional barcode or a two-dimensional barcode (such as a QR Code®).

The display optical system 102 is a light-guiding optical system that optically guides information (such as a word or an image) displayed on a display 110 (not illustrated in FIG. 1) to the front of the eyes of the worker, and has a configuration in which the worker can see the outside world together with the displayed information in his/her field of view. For example, a configuration may be used that is similar to the configuration of the display optical system disclosed in Japanese Laid-open Patent Publication No. 2007-163634.

The manipulation button 103 is a button that is used when the worker gives a predetermined instruction (such as an instruction to start or terminate a barcode reading operation described later) to the barcode reader 100.

FIG. 2 illustrates an example of a hardware configuration of the barcode reader 100.

As illustrated in FIG. 2, the barcode reader 100 includes a bus 104, a RAM (random access memory) 105, a ROM (read only memory) 106, an image processing unit 107, a wireless communication unit 108, a CPU (central processing unit) 109, the display 110, the imaging unit 111, a motor 112, a manipulation unit 113, an acceleration sensor 114, and the lens 101, wherein the RAM 105, the ROM 106, the image processing unit 107, the wireless communication unit 108, and the CPU 109 are connected to the bus 104, and the display 110, the imaging unit 111, the motor 112, the manipulation unit 113, and the acceleration sensor 114 are connected to the CPU 109.

As described above, the lens 101 is an optical system that collects a light flux from a subject that includes a barcode into the imaging unit 111, and includes a focusing lens and a zoom lens (not illustrated).

The motor 112 is a motor that moves the focusing lens and the zoom lens included in the lens 101 in an optical direction of the lens 101. Due to the motor 112 being driven, the focusing lens and the zoom lens are moved so as to change a focal position and a focal length.

The imaging unit 111 converts a light flux from a subject that is collected by the lens 101 into an analog electric signal (hereinafter referred to as an image signal). This conversion is performed by an imaging element (not illustrated) that is included in the imaging unit 111. For example, the imaging element is an image sensor such as a CCD (charge coupled device) image sensor or a CMOS (complementary metal oxide semiconductor) image sensor. Further, the imaging unit 111 performs analog processing, such as CDS (correlated double sampling) processing or AGC (automatic gain control) processing, with respect to an image signal. Furthermore, the imaging unit 111 converts the image signal on which analog processing has been performed into a digital electric signal (hereinafter referred to as image data) and outputs the digital electric signal.

The bus 104 is a transmission line for data that is transmitted and received between the RAM 105, the ROM 106, the image processing unit 107, the wireless communication unit 108, and the CPU 109 that are connected to the bus 104.

The image processing unit 107 performs a variety of image processing on image data. For example, with respect to image data, the image processing unit 107 performs image processing suitable to recognize a barcode included in an image represented by the image data.

The RAM 105 is a memory used as, for example, a working area, and, for example, image data that is being processed, picking order data (work instruction data), and the like are temporarily stored in the RAM 105. The picking order data is obtained by digitizing a work instruction of a picking work (such as a picking list illustrated in FIG. 14), and is input from, for example, an external server through the wireless communication unit 108.

The wireless communication unit 108 performs a wireless communication with an external device. Performing a wireless communication with an external device also includes communicating with an external device via a wireless access point (for example, via a nearest wireless access point). In this case, the communication between a wireless access point and an external device may be a wireless communication, or a wire communication, or a combination of a wireless communication and a wire communication. For example, the wireless communication unit 108 performs a wireless communication with an external device such as an external server using, for example, a wireless LAN (local area network), and receives picking order data from the external device. The received picking order data is then stored in the RAM 105.

A program executed by the CPU 109, data used during the execution of the program, and the like are stored in the ROM 106.

The CPU 109 controls an operation of the barcode reader 100 by executing a program stored in the ROM 106. For example, the CPU 109 controls the barcode reading operation described later.

The display 110 is a display panel such as a transmissive or reflective liquid crystal display element, a self-luminous organic EL (electro luminescence) element, or an inorganic EL element, and displays a variety of information. The information displayed on the display 110 is guided to the front of the eyes of the worker through the display optical system 102 described above.

The manipulation unit 113 includes the manipulation button 103 described above, and, for example, it reports an electric signal according to a depressed state of the manipulation button 103 to the CPU 109.

The acceleration sensor 114 is, for example, a three-axis acceleration sensor, and it detects an orientation of the barcode reader 100 and reports a result of the detection to the CPU 109.

Figure 3:
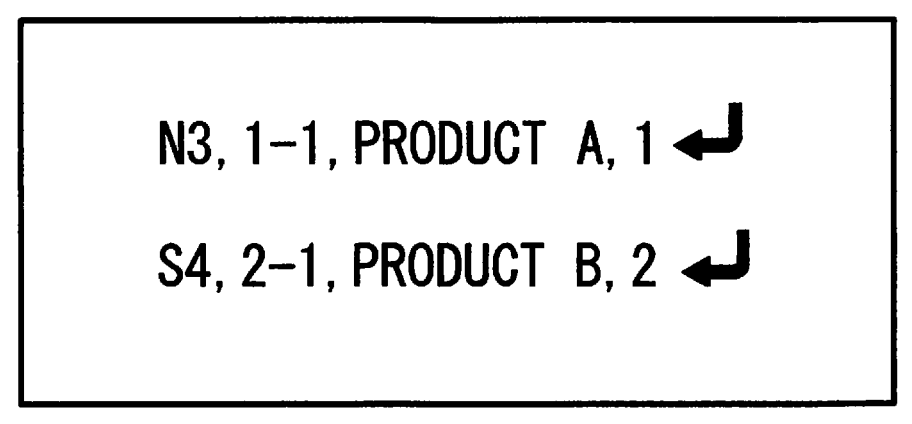

FIG. 3 illustrates an example of picking order data.

Figure 14:
FIG. 14 illustrates an example of a picking list.
Figure 14:
Figure 15:
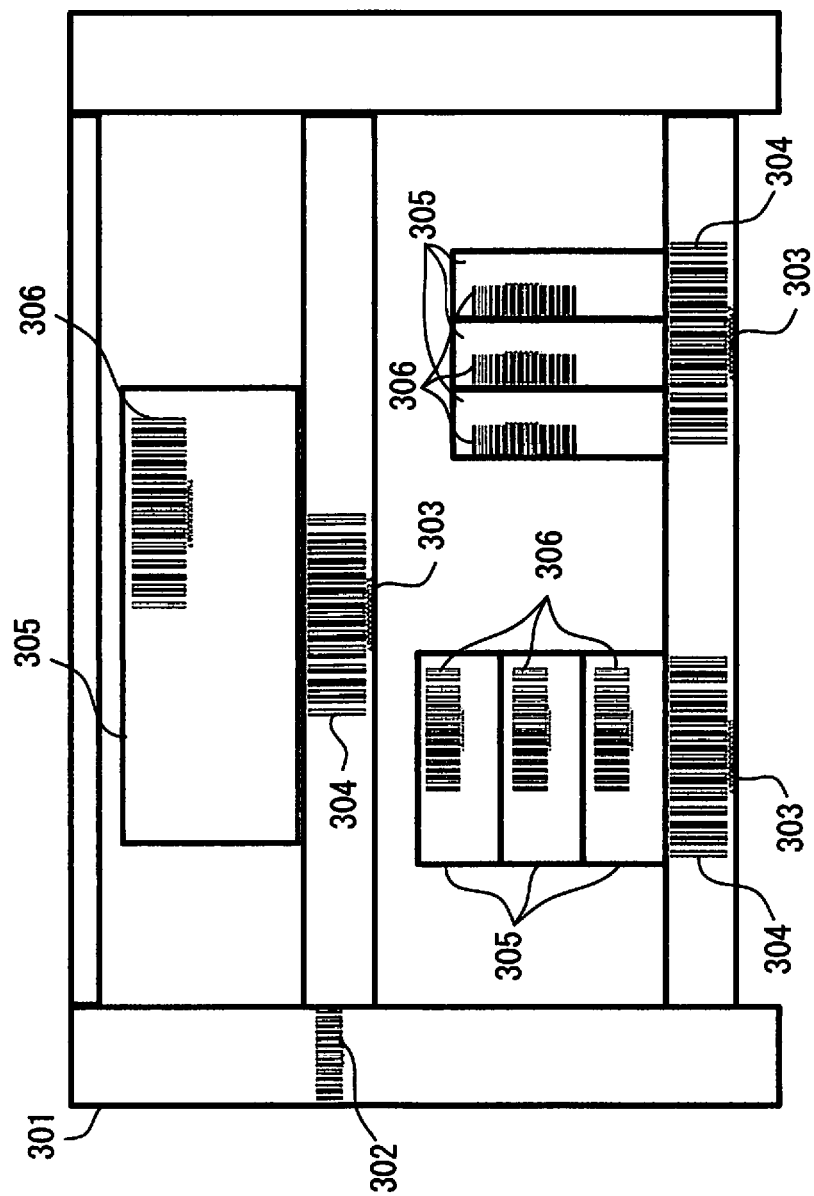
FIG. 15 illustrates an example of the inside of a distribution warehouse where a picking work is performed.

The picking order data illustrated in FIG. 3 is obtained by digitizing the picking list illustrated in FIG. 14, and each line in the picking order data corresponds to each line in the picking list.

As illustrated in FIG. 3, each line in the picking order data includes information on a shelf number (that is also shelf barcode information), information on a coordinate (that is also coordinate barcode information), information on a product (that is also product barcode information), and information on a quantity. For example, the first line indicates that the information on a shelf number is "N3", the information on a coordinate is "1-1", the information on a product is "product A", and the information on a quantity is "1". In other words, this indicates that an instruction to pick up "one" "product A" situated at a coordinate "1-1" on a shelf with a shelf number "N3" is to be given to a worker, as indicated in the first line in the picking list illustrated in FIG. 14.

Figure 4:
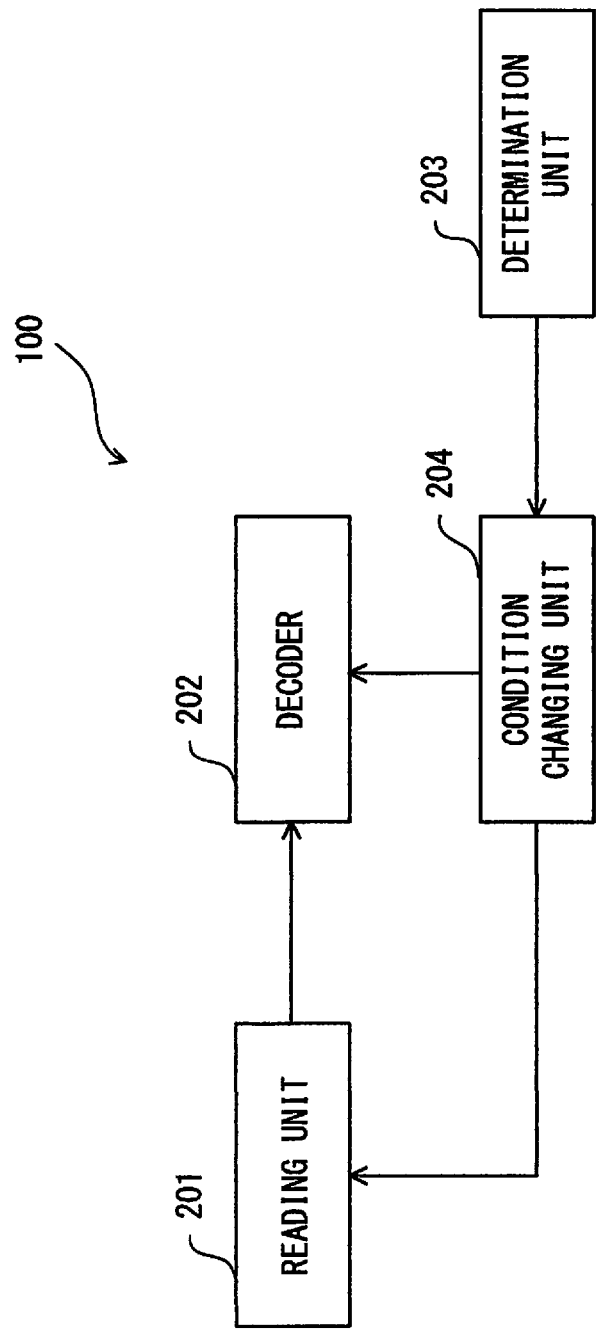
FIG. 4 illustrates an example of a functional block of the barcode reader according to the embodiment.

FIG. 4 illustrates an example of a functional block of the barcode reader 100.

As illustrated in FIG. 4, the barcode reader 100 includes a reading unit 201, a decoder 202, a determination unit 203, and a condition changing unit 204.

The reading unit 201 reads a barcode. The reading unit 201 corresponds to, for example, the lens 101, the motor 112, and the imaging unit 111.

The decoder 202 decodes the barcode read by the reading unit 201 so as to obtain barcode information. The decoder 202 corresponds to, for example, a portion of the functions of the CPU 109.

The determination unit 203 determines whether the barcode information obtained by the decoder 202 matches barcode information stored in a storage of the barcode reader 100. The determination unit 203 corresponds to, for example, another portion of the functions of the CPU 109. The barcode information stored in the storage of the barcode reader 100 corresponds to, for example, barcode information included in picking order data stored in the RAM 105.

When a result of the determination performed by the determination unit 203 is "match", the condition changing unit 204 changes a reading condition of the reading unit 201 or a decoding condition of the decoder 202. The condition changing unit 204 corresponds to, for example, yet another portion of the functions of the CPU 109.

Figure 5:
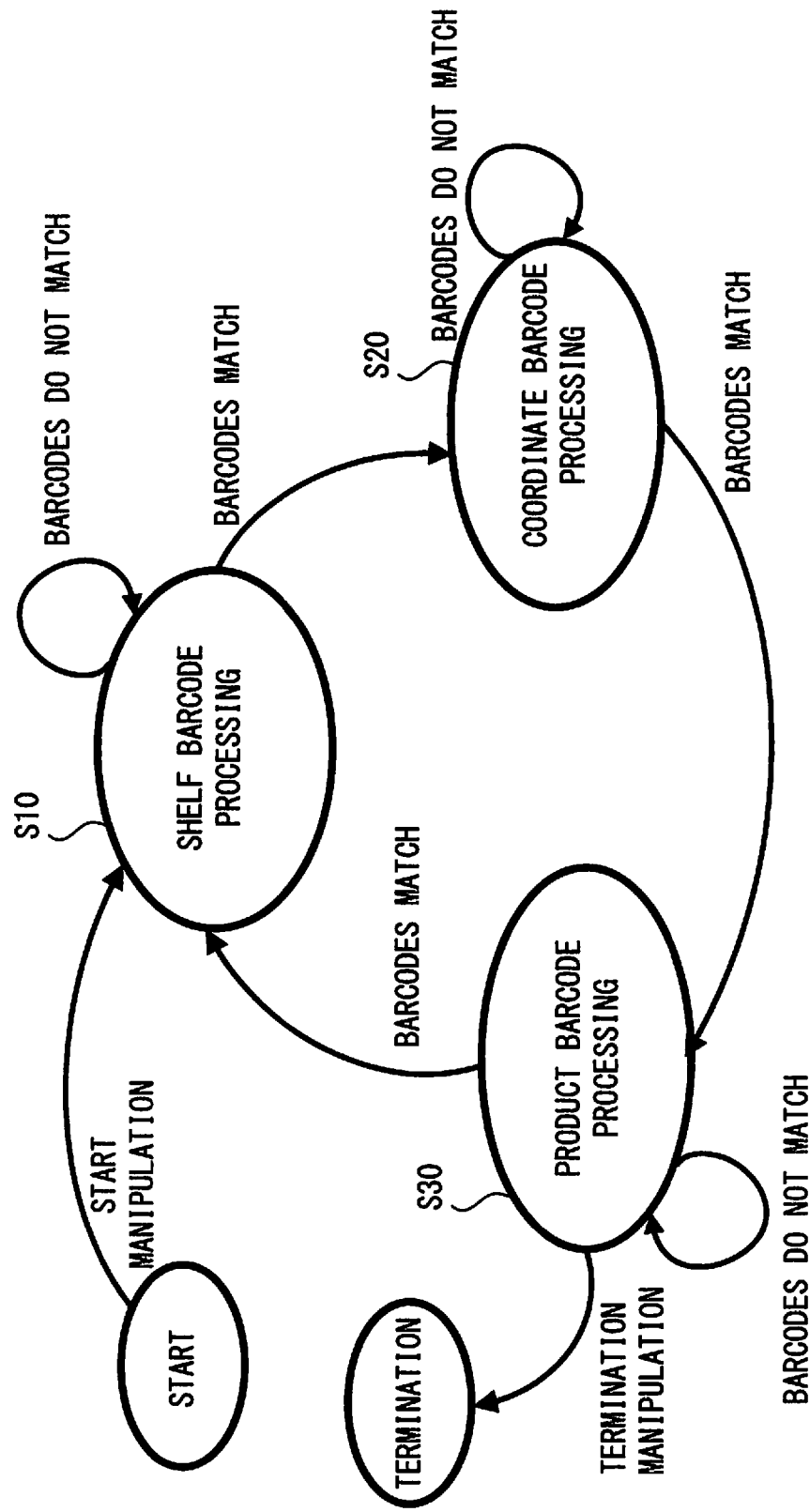
FIG. 5 illustrates an overview of an example of a barcode reading operation performed by the barcode reader according to the embodiment.

FIG. 5 illustrates an overview of an example of a barcode reading operation performed by the barcode reader 100. This barcode reading operation is an operation that is performed when a worker who is wearing the barcode reader 100 as illustrated in FIG. 1 performs a picking work in a distribution warehouse.

As illustrated in FIG. 5, this barcode reading operation is started when the CPU 109 detects a manipulation (a start manipulation) of the manipulation button 103 that is performed by the worker in a state in which picking order data is stored in the RAM 105.

When the barcode reading operation is started, the CPU 109 repeatedly performs a series of processing including shelf barcode processing (S10), coordinate barcode processing (S20), and product barcode processing (S30) for each instruction indicated in each line in the picking order data.

In each barcode processing, a barcode is read and decoded in a setting according to a reading target barcode, it is determined whether barcode information obtained by the reading and decoding matches information (barcode information) that is included in an instruction in a processing target line in picking order data, and the process moves on to the next barcode processing when a result of the determination is "match", although this will be described in detail later. Further, in each barcode processing, the information included in the instruction in the processing target line in the picking order data is displayed on the display 110, and the worker moves to another place or picks up a product according to the displayed information.

Then, after a series of processing from S10 to S30 is terminated with respect to all of the instructions indicated in each line in the picking order data, the CPU 109 terminates the barcode reader operation when the CPU 109 detects a manipulation (termination manipulation) of the manipulation button 103 that is performed by the worker.

Figure 6:
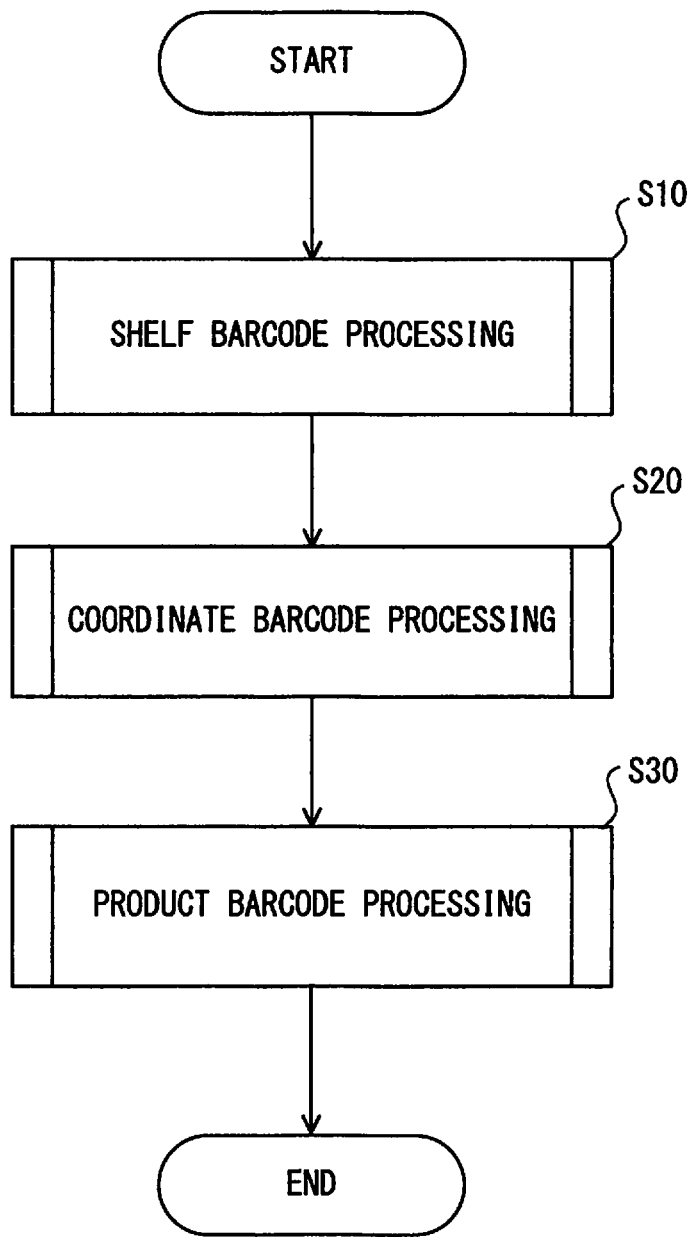
FIG. 6 is a flowchart that illustrates a series of processing from S10 to S30 that is performed for each instruction indicated in each line in picking order data.

FIG. 6 is a flowchart that illustrates the series of processing from S10 to S30 that is performed for each instruction indicated in each line in picking order data.

As illustrated in FIG. 6, in this series of processing, first, the CPU 109 performs the shelf barcode processing (S10). In this shelf barcode processing, for example, a barcode is read and decoded in a setting suitable for a shelf barcode, and it is determined whether barcode information obtained by the reading and decoding matches information on a shelf number (shelf barcode information) that is included in an instruction in a processing target line in picking order data, although this will be described in detail later with reference to FIG. 7. In this shelf barcode processing, the information on a shelf number (shelf barcode information) that is included in the instruction in the processing target line in the picking order data is displayed on the display 110, and the worker moves to a shelf with the shelf number according to the displayed information.

When a result of the determination performed in S10 is "match", the CPU 109 performs the coordinate barcode processing (S20). In this coordinate barcode processing, a barcode is read and decoded in a setting suitable for a coordinate barcode, and it is determined whether barcode information obtained by the reading and decoding matches information on a coordinate (coordinate barcode information) that is included in the instruction in the processing target line in the picking order data, although this will be described in detail later with reference to FIG. 9. In this coordinate barcode processing, the information on a coordinate (coordinate barcode information) that is included in the instruction in the processing target line in the picking order data is displayed on the display 110, and the worker moves to a position of the coordinate according to the displayed information.

When a result of the determination performed in S20 is "match", the CPU 109 performs the product barcode processing (S30). In this product barcode processing, a barcode is read and decoded in a setting suitable for a product barcode, and it is determined whether barcode information obtained by the reading and decoding matches information on a product (product barcode information) that is included in the instruction in the processing target line in the picking order data, although this will be described in detail later with reference to FIG. 11. In this product barcode processing, the information on a product (product barcode information) and information on a quantity that are included in the instruction in the processing target line in the picking order data are displayed on the display 110, and the worker picks up a displayed number of products according to the displayed information.

FIG. 7 is a flowchart that illustrates an example of the shelf barcode processing (S10).

As illustrated in FIG. 7, in this shelf barcode processing, first, the CPU 109 sets a reading condition (image-capturing condition) or a decoding condition (for a shelf barcode) that is suitable for a shelf barcode (S101). For example, when a reading condition suitable for the shelf barcode is set, a short focal length (a focal length at the wide side) is set to be a focal length used when image-capturing is performed by the imaging unit 111, the short focal length being the reading condition. This results in obtaining an image with a wide angle of view as an image represented by image data obtained in S102 described later.

Further, in S101, the CPU 109 displays, on the display 110, information on a shelf number (shelf barcode information) that is included in an instruction in a processing target line in picking order data, and urges a worker to move to a shelf with the shelf number. For example, when the processing target line in the picking order data is the first line in the picking order data illustrated in FIG. 3, a shelf number "N3" is displayed on the display 110, and the worker is urged to move to a shelf with the shelf number "N3".

Figure 8:
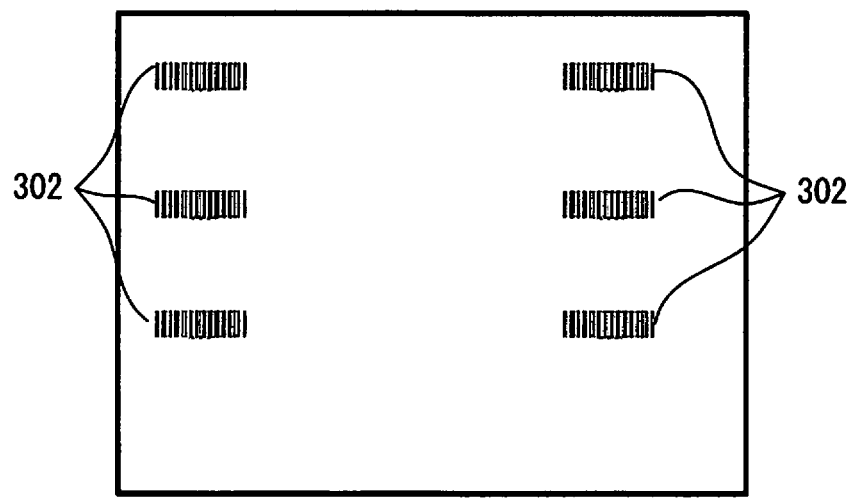
FIG. 8 illustrates an example of an image that includes a plurality of barcodes.

Next, under the condition set in S101, the CPU 109 causes the imaging unit 111 to obtain image data (S102), and recognizes a barcode included in an image represented by the image data so as to decode the barcode (S103). In S102, with respect to the image data obtained by the imaging unit 111, the image processing unit 107 may further perform image processing suitable to recognize a barcode in S103. Further, when the image represented by the image data obtained in S102 includes a plurality of barcodes, for example, as illustrated in FIG. 8, each of the plurality of barcodes is decoded in S103 so as to obtain a plurality of pieces of barcode information. The image illustrated in FIG. 8 includes six shelf barcodes 302 and is obtained, for example, when the worker is situated in a position in which the barcode which he/she can see is only a shelf barcode.

Next, the CPU 109 determines whether the barcode information decoded in S103 matches the information on a shelf number (shelf barcode information) that is included in the instruction in the processing target line in the picking order data (S104). However, when there exist a plurality of pieces of barcode information that have been decoded in S103, it is determined in S104 whether the information on a shelf number (shelf barcode information) that is included in the instruction in the processing target line in the picking order data is included in the plurality of pieces of barcode information.

When a result of the determination of S104 is NO, the process returns to S102.

On the other hand, when the result of the determination of S104 is YES, the shelf barcode processing is terminated (returned).

FIG. 9 is a flowchart that illustrates an example of the coordinate barcode processing (S20).

As illustrated in FIG. 9, in this coordinate barcode processing, first, the CPU 109 sets a reading condition (image-capturing condition) or a decoding condition (for a coordinate barcode) that is suitable for a coordinate barcode (S201). For example, when a reading condition suitable for a coordinate barcode is set, a focal length longer than the focal length set in S101 is set to be a focal length used when image-capturing is performed by the imaging unit 111, the longer focal length being the reading condition. This results in obtaining, as an image represented by image data obtained in S202 described later, an image with a narrower angle of view than that of the image represented by the image data obtained in S101 described above.

Further, in S201, the CPU 109 displays, on the display 110, information on a coordinate (coordinate barcode information) that is included in the instruction in the processing target line in the picking order data, and urges the worker to move to a position of the coordinate. For example, when the processing target line in the picking order data is the first line in the picking order data illustrated in FIG. 3, a coordinate "1-1" is displayed on the display 110, and the worker is urged to move to a position of the coordinate "1-1".

Figure 10:
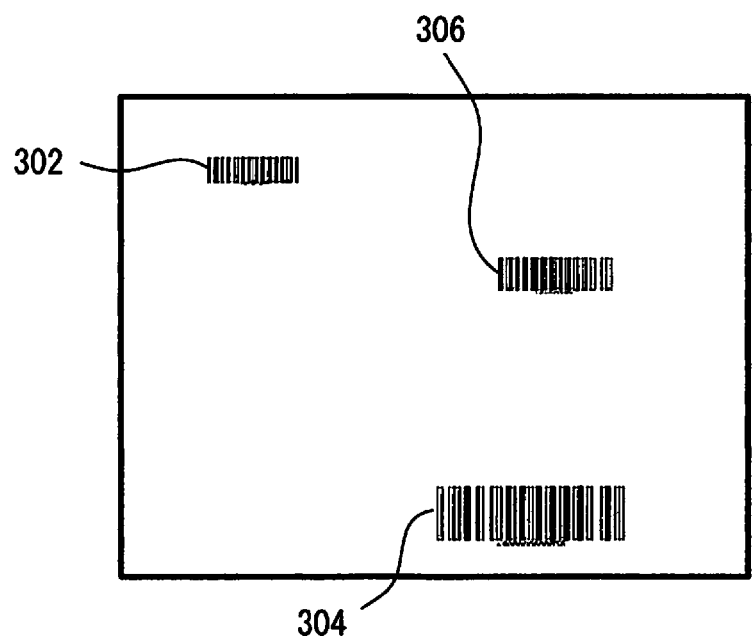
FIG. 10 illustrates an example of an image that includes a plurality of barcodes.

Next, under the condition set in S201, the CPU 109 causes the imaging unit 111 to obtain image data (S202), and recognizes a barcode included in an image represented by the image data so as to decode the barcode (S203). In S202, with respect to the image data obtained by the imaging unit 111, the image processing unit 107 may further perform image processing suitable to recognize a barcode in S203. Further, when the image represented by the image data obtained in S202 includes a plurality of barcodes, for example, as illustrated in FIG. 10, each of the plurality of barcodes is decoded in S203 so as to obtain a plurality of pieces of barcode information. The image illustrated in FIG. 10 includes one shelf barcode 302, one coordinate barcode 304, and one product barcode 306.

Next, the CPU 109 determines whether the barcode information decoded in S203 matches the information on a coordinate (coordinate barcode information) that is included in the instruction in the processing target line in the picking order data (S204). However, when there exist a plurality of pieces of barcode information that have been decoded in S203, it is determined in S204 whether the information on a coordinate (coordinate barcode information) that is included in the instruction in the processing target line in the picking order data is included in the plurality of pieces of barcode information.

When a result of the determination of S204 is NO, the process returns to S202.

On the other hand, when the result of the determination of S204 is YES, the coordinate barcode processing is terminated (returned).

Figure 11:
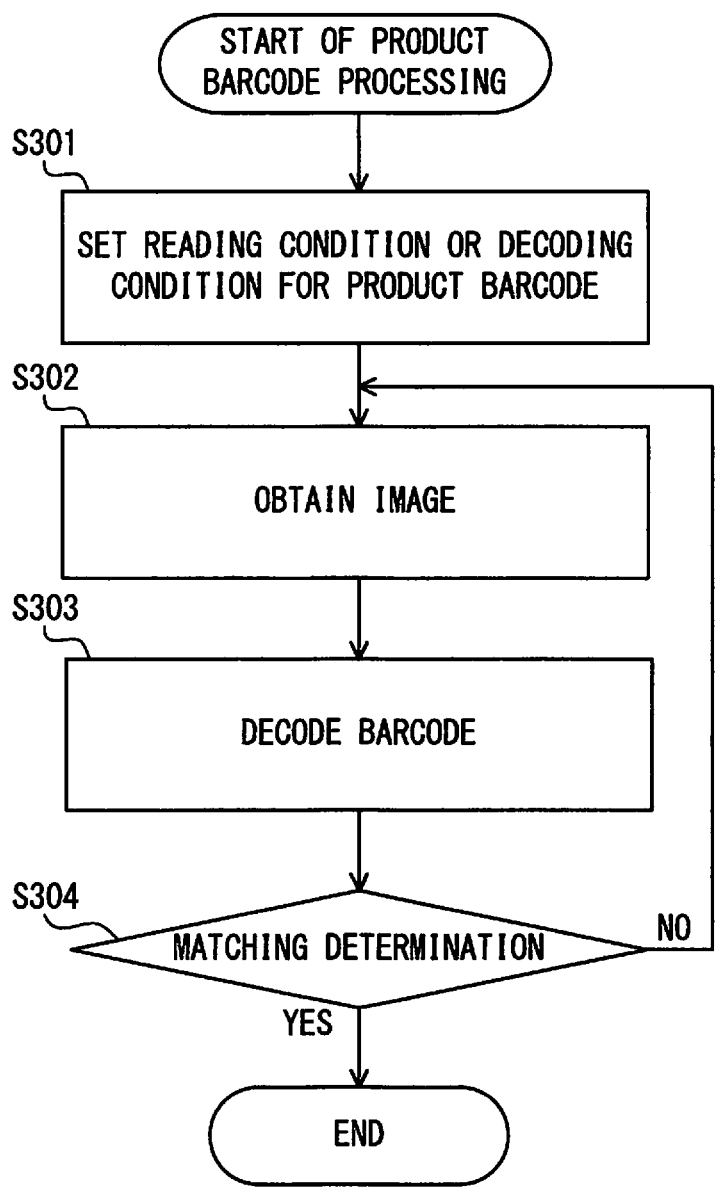
FIG. 11 is a flowchart that illustrates an example of product barcode processing (S30)

FIG. 11 is a flowchart that illustrates an example of the product barcode processing (S30).

As illustrated in FIG. 11, in this product barcode processing, first, the CPU 109 sets a reading condition (image-capturing condition) or a decoding condition (for a product barcode) that is suitable for a product barcode (S301). For example, when a reading condition suitable for a product barcode is set, a focal length (a focal length at the tele side) even longer than the focal length set in S201 is set to be a focal length used when image-capturing is performed by the imaging unit 111, the longer focal length being the reading condition. This results in obtaining, as an image represented by image data obtained in S302 described later, an image with an angle of view even narrower than that of the image represented by the image data obtained in S201 described above.

Further, in S301, the CPU 109 displays, on the display 110, information on a product (product barcode information) and information on a quantity that are included in the instruction in the processing target line in the picking order data, and urges the worker to pick up a displayed number of products. For example, when the processing target line in the picking order data is the first line in the picking order data illustrated in FIG. 3, "PRODUCT A" and "1" are displayed on the display 110, and the worker is urged to pick up "one" "product A".

Next, under the condition set in S301, the CPU 109 causes the imaging unit 111 to obtain image data (S302), and recognizes a barcode included in an image represented by the image data so as to decode the barcode (S303). In S302, with respect to the image data obtained by the imaging unit 111, the image processing unit 107 may further perform image processing suitable to recognize a barcode in S303. Further, when the image represented by the image data obtained in S302 includes a plurality of barcodes, each of the plurality of barcodes is decoded in S303 so as to obtain a plurality of pieces of barcode information.

Next, the CPU 109 determines whether the barcode information decoded in S303 matches the information on a product (product barcode information) that is included in the instruction in the processing target line in the picking order data (S304). However, when there exist a plurality of pieces of barcode information that have been decoded in S303, it is determined in S304 whether the information on a product (product barcode information) that is included in the instruction in the processing target line in the picking order data is included in the plurality of pieces of barcode information.

When a result of the determination of S304 is NO, the process returns to S302.

On the other hand, when the result of the determination of S304 is YES, the product barcode processing is terminated (returned).

According to the series of processing from S10 to S30 performed as described above, for example, in a shelf barcode reading, image data is obtained with a short focal length (a wide angle of view), in a coordinate barcode reading, image data is obtained with a focal length longer than the focal length in the shelf barcode reading (a narrower angle of view), and in a product barcode reading, image data is obtained with a focal length even longer than the focal length in the coordinate barcode reading (an even narrower angle of view).

In the series of processing from S10 to S30 described above, for example, when a decoding condition is set in each of S101, S201, and S301, a barcode recognizing range (a barcode recognizing range in an image represented by image data) that is used when a barcode is recognized may be set in each of S103, S203, and S303 as the decoding condition. In this case, the barcode recognizing range set in S201 is a range that is narrower than the barcode recognizing range set in S101, and the barcode recognizing range set in S301 is a range that is even narrower than the barcode recognizing range set in S201. The barcode recognizing range in this case can be defined, for example, by a length from the center of the image.

Figure 12:
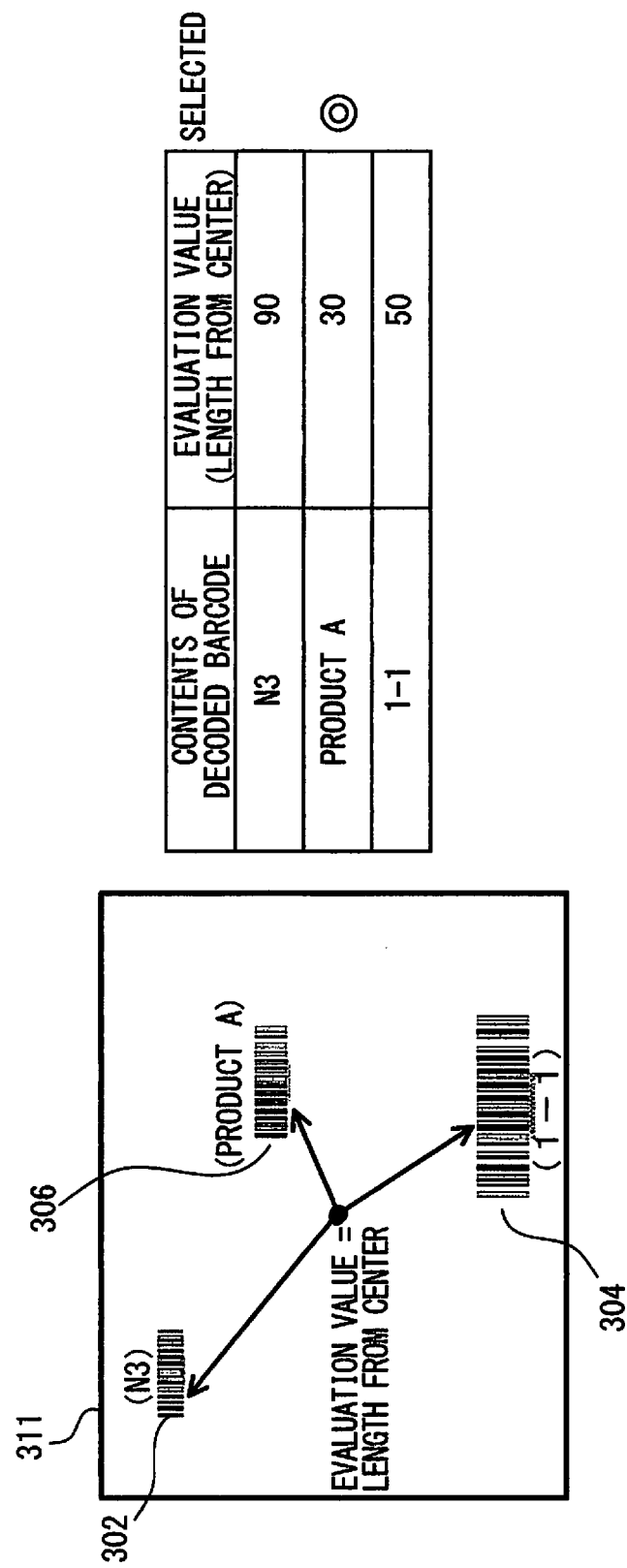
FIG. 12 is a diagram that explains an example of a barcode decoding range.

Alternatively, a barcode decoding range (a barcode decoding range in an image represented by image data) that is used when a barcode is decoded may be set in each of S103, S203, and S303 as the decoding condition. In this case, the barcode decoding range set in S201 is a range that is narrower than the barcode decoding range set in S101, and the barcode decoding range set in S301 is a range that is even narrower than the barcode decoding range set in S201. The barcode decoding range in this case can also be defined, for example, by a length from the center of the image. FIG. 12 is a diagram that explains an example of this, wherein a range in which an evaluation value (that corresponds to the length from the center of the image) is within 40 is set to be a barcode decoding range in S301, the evaluation value being a decoding condition suitable for a product barcode. As illustrated in FIG. 12, in this example, a barcode (shelf barcode 302 of "N3") with an evaluation value "90", a barcode (coordinate barcode 304 of "1-1") with an evaluation value "50", and a barcode (product barcode 306 of "PRODUCT A") with an evaluation value "30" are recognized in S303 from an image 311 represented by image data, and, from among these barcodes, only the barcode (the product barcode 306 of "PRODUCT A") with the evaluation value "30", which is within 40, is decoded.

As described above, according to the present embodiment, a condition (a reading condition or a decoding condition) used when a barcode is read is changed according to a progress of a picking work, so as to read a target barcode without bringing the barcode reader 100 close to the target barcode.

The following modification may also be made to the present embodiment.

In the series of processing from S10 to S30 described above, for example, both a reading condition (image-capturing condition) and a decoding condition may be set in each of S101, S201, and S301.

Further, in the series of processing from S10 to S30 described above, for example, when a plurality of barcodes are recognized in an image represented by image data in each of S103, S203, and S303, the plurality of barcodes may be decoded in a predetermined order of priority. In this case, the predetermined order of priority may be set such that, for example, a barcode with a shorter length from the center of the image has a higher priority. In this case, a matching determination of barcode information may be performed every time a barcode is decoded in the order of priority and the barcode processing may be terminated (returned) as soon as a result of the determination is "match".

For example, when a specific subject is recognized along with a plurality of barcodes in an image represented by image data in each of S103, S203, and S303, a barcode situated closest to the specific subject may be preferentially decoded, or the plurality of barcodes may be decoded sequentially from a barcode situated closer to the specific subject. In the latter case, a matching determination of barcode information may be performed every time a barcode is decoded and the barcode processing may be terminated (returned) as soon as a result of the determination is "match". The specific subject is, for example, the finger of a worker who is pointing with the finger.

For example, in each of S103, S203, and S303, an order of priority may be set for each area in an image represented by image data, and a plurality of barcodes recognized in the image may be decoded in the order of priority. In other words, the plurality of barcodes may be decoded sequentially from a barcode included in a higher-priority area. Also in this case, a matching determination of barcode information may be performed every time a barcode is decoded and the barcode processing may be terminated (returned) as soon as a result of the determination is "match".

Furthermore, in the series of processing from S10 to S30 described above, for example, each of the processes of S104, S204, and S304 may be performed only when an orientation of the barcode reader 100 that is detected by the acceleration sensor 114 is a predetermined orientation. The predetermined orientation is, for example, an orientation detected when a worker is walking, an orientation detected when the worker is at rest, or an orientation detected when the worker is looking at a shelf, a position on the shelf, and a product placed on the shelf.

In the present embodiment, the example in which a work instruction of a picking work is provided in the form of electronic data such as the picking order data illustrated in FIG. 3 has been described, but it may be provided in the form of, for example, a form such as the picking list illustrated in FIG. 14. In this case, the barcode reader 100 reads a form barcode printed on the form so that the same data as picking order data is stored in the RAM 105.

Figure 13:
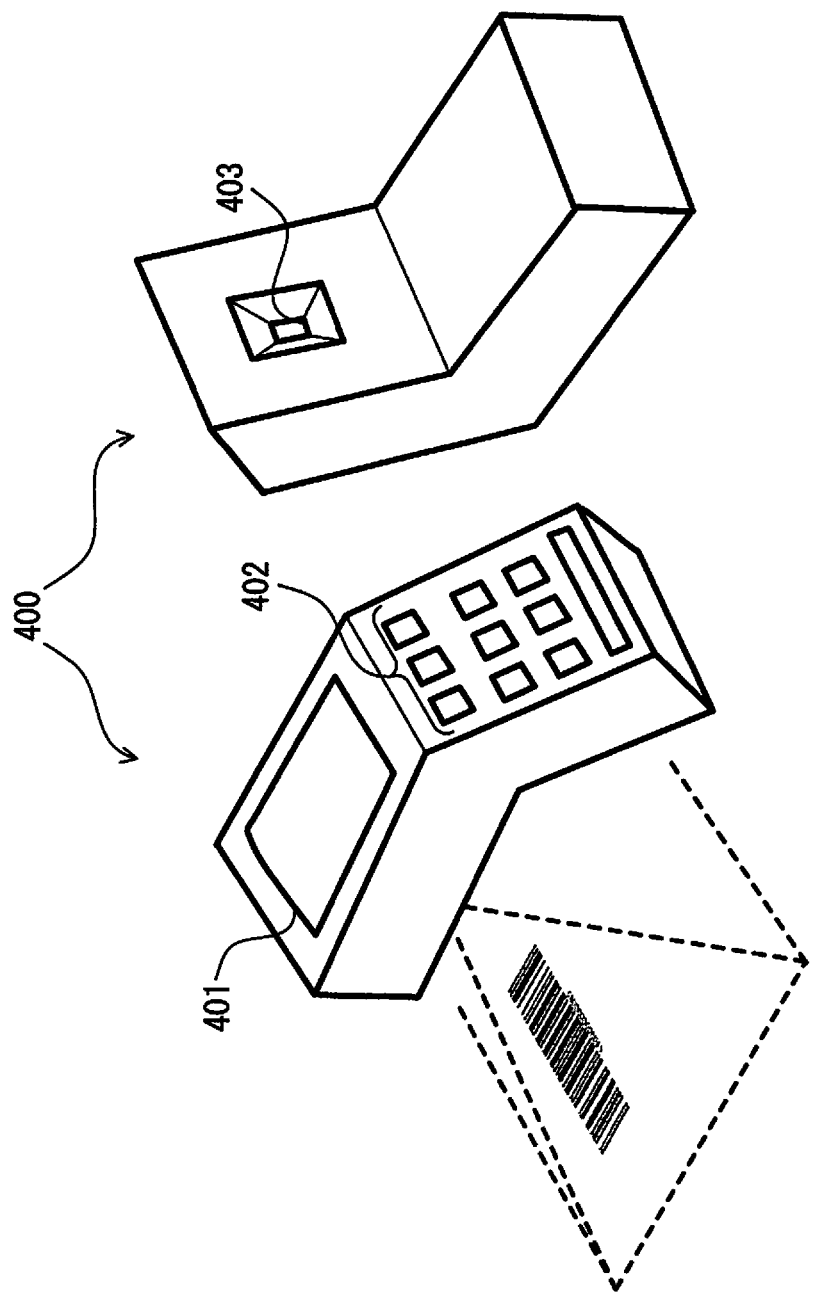
FIG. 13 illustrates a variation of the barcode reader according to the embodiment.

The barcode reader 100 is not limited to the barcode reader that is mounted like glasses on the head of a worker as illustrated in FIG. 1, but it may be a handheld barcode reader, for example, as illustrated in FIG. 13. A barcode reader 400 illustrated in FIG. 13 includes a display 401 and manipulation buttons 402 on one of the sides of the barcode reader 400, as illustrated on the left side of FIG. 13, and it includes a lens 403 on another one of the sides of the barcode reader 400, as illustrated on the right side of FIG. 13. The display 401 corresponds to the display 110, the manipulation buttons 402 correspond to a manipulation button included in the manipulation unit 113 (for example, the manipulation button 103), and the lens 403 corresponds to the lens 101.

The embodiments described above are just examples to facilitate understanding of the present invention, and the invention is not limited to these embodiments. Various modifications and alterations may be made hereto without departing from the spirit of the invention specified in the claims.

What is claimed is:

1. A barcode reader comprising:
a storage that stores a piece of barcode information as a comparison object that follows an order list that is based on a preset sequence, the comparison object being an object to be compared;
a reading unit that reads a barcode;
a decoder that decodes the barcode read by the reading unit so as to obtain barcode information;
a determination unit that determines whether the barcode information obtained by the decoder matches the barcode information stored in the storage; and
a changing unit that, when a result of the determination performed by the determination unit is "match", changes the comparison object from the piece of barcode information to another piece of barcode information according to the preset sequence and changes a reading condition of the reading unit or a decoding condition of the decoder.

2. The barcode reader according to claim 1, wherein
the reading unit outputs image data obtained by capturing an image of the barcode, and
the decoder recognizes the barcode in the image represented by the image data output from the reading unit, and decodes the recognized barcode so as to obtain barcode information.

3. The barcode reader according to claim 2, wherein
when the result of the determination performed by the determination unit is "match", the changing unit changes a focal length used when the reading unit captures an image of a barcode, wherein the focal length is the reading condition of the reading unit.

4. The barcode reader according to claim 3, wherein
the focal length after the change performed by the changing unit is longer than the focal length before the change performed by the changing unit.

5. The barcode reader according to claim 2, wherein
when the result of the determination performed by the determination unit is "match", the changing unit changes a range in which the decoder recognizes the barcode in the image represented by the image data output from the reading unit, wherein the range is a decoding condition of the decoder.

6. The barcode reader according to claim 5, wherein
the range after the change performed by the changing unit is narrower than the range before the change performed by the changing unit.

7. The barcode reader according to claim 2, wherein
when the decoder recognizes a plurality of barcodes in the image represented by the image data output from the reading unit, the decoder decodes the plurality of barcodes in a predetermined order of priority.

8. The barcode reader according to claim 2, wherein
when the decoder recognizes a specific subject along with a plurality of barcodes in the image represented by the image data output from the reading unit, the decoder preferentially decodes the barcode situated closest to the specific subject.

9. The barcode reader according to claim 2, wherein
when the decoder recognizes a plurality of barcodes in the image represented by the image data output from the reading unit, the decoder decodes the plurality of barcodes in an order of priority determined for each area in the image.

10. The barcode reader according to claim 1, further comprising an orientation detector that detects an orientation of the barcode reader, wherein
when the orientation detected by the orientation detector is a predetermined orientation, the determination unit determines whether the barcode information obtained by the decoder matches the barcode information stored in the storage.

11. A barcode reading method of a barcode reader, the method comprising:
storing, in a storage, a piece of barcode information as a comparison object that follows an order list that is based on a preset sequence, the comparison object being an object to be compared;
reading a barcode;
decoding the read barcode so as to obtain barcode information;

determining whether the obtained barcode information matches the barcode information stored in the storage; and when a result of the determination is "match", changing the comparison object from the piece of barcode information to another piece of barcode information according to the preset sequence and changing a reading condition of the reading or a decoding condition of the decoding.

12. A non-transitory computer-readable recording medium storing a program for causing a computer of a barcode reader to execute a process comprising:

storing, in a storage, a piece of barcode information as a comparison object that follows an order list that is based on a preset sequence, the comparison object being an object to be compared;

reading a barcode;

decoding the read barcode so as to obtain barcode information;

determining whether the obtained barcode information matches the barcode information stored in the storage; and when a result of the determination is "match", changing the comparison object from the piece of barcode information to another piece of barcode information according to the preset sequence and changing a reading condition of the reading or a decoding condition of the decoding.

* * * * *